Oct. 27, 1925.

J. H. SHAW 1,559,189

GEAR SHIFT LEVER LOCK

Filed May 13, 1920  2 Sheets-Sheet 1

Inventor
John H. Shaw
By Henry E. Rockwell
Attorney

Oct. 27, 1925.  1,559,189
J. H. SHAW
GEAR SHIFT LEVER LOCK
Filed May 13, 1920   2 Sheets-Sheet 2

Inventor
John H. Shaw
By Henry E. Rockwell
Attorney

Patented Oct. 27, 1925.

1,559,189

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

GEAR-SHIFT-LEVER LOCK.

Application filed May 13, 1920. Serial No. 381,146.

*To all whom it may concern:*

Be it known that I, JOHN H. SHAW, a citizen of the United States, and a resident of the city of New Haven, county of New Haven, State of Connecticut, have invented certain new and useful Improvements in Gear-Shift-Lever Locks, of which the following is a clear, true, and exact description.

This invention relates to locks, and more particularly to means for locking control levers of various kinds against operative movement.

One object of my invention is to provide means for locking a control lever against movement which will be composed of few parts to get out of order and will be easy and simple of operation.

Another object of my invention is to provide a lever locking means which may be moved to position to engage the lever itself and thus securely hold the lever against movement.

A further object of the invention is to so position the locking means that it will be accessible to the operator and yet be in position to effectually lock the lever against movement.

To this and other ends the invention consists in the novel features and combinations of parts to be hereinafter described and claimed. While I have chosen to show a preferred embodiment my invention applied to a gear shift lever for motor vehicles, it is to be understood that the invention is not limited to this type of levers but is capable of various uses and modifications without departing from the spirit of the invention or the scope of claims hereinafter made.

Figure 1:
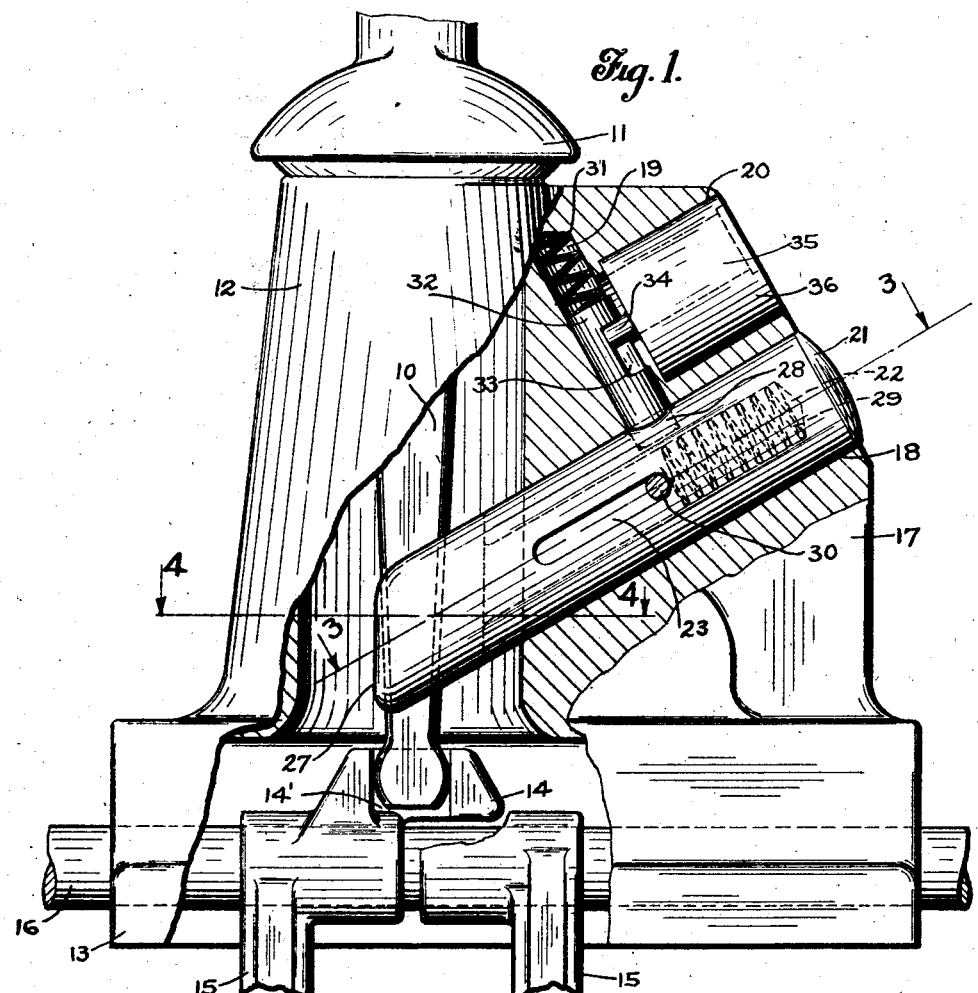
Figure 1 is a view in elevation of the lower end of a motor vehicle gear shift lever and associated parts, embodying my invention, some parts being broken away to more clearly disclose the novel elements, showing the parts in locked position.

With reference to the drawings, I have shown a usual form of motor vehicle gear shifting mechanism consisting of a shift lever 10, which is pivoted for universal movement at 11 in the top of the casting 12. This casting is above the gear casing 13 of the vehicle and the lower end of the lever 10 extends down into this casing and engages upwardly extending lugs 14, on the shifting yokes 15, which are slidably mounted on the rod 16. The lugs are provided with the recessed portions 14', within which the lever 10 engages when it is moved laterally prior to movement of the yokes 14 longitudinally to shift the gears. In some makes of motor vehicles two shifter rods 16 are provided and these rods mounted to move instead of slidably supporting the shifting yokes. As my improved locking means engages the lever and not the rods or yokes, it is applicable to any of the different makes of cars. The parts above described are of usual and well-known construction and form no part of the present invention.

Figure 2:
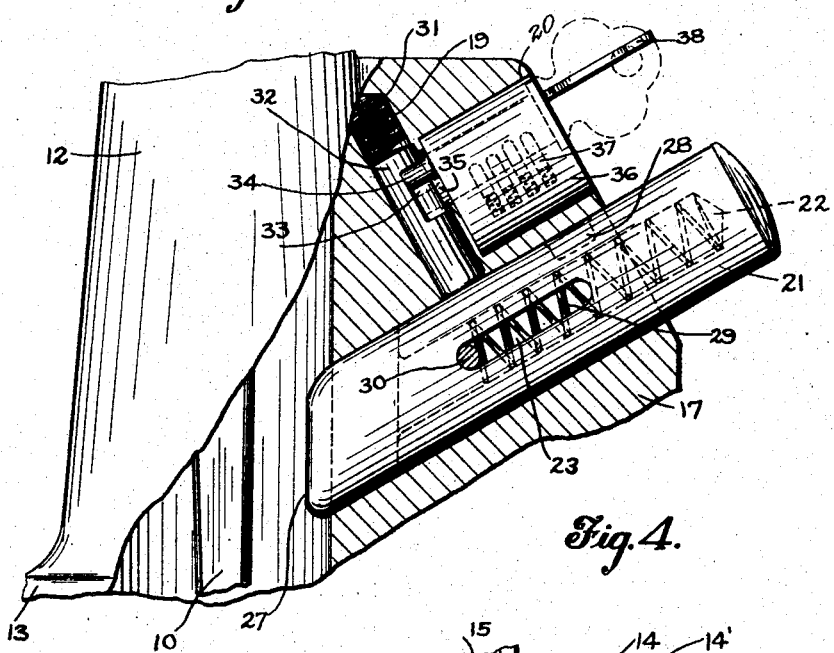
Figure 2 is a detail view of the locking mechanism, showing the parts in unlocked position.
Figure 4:
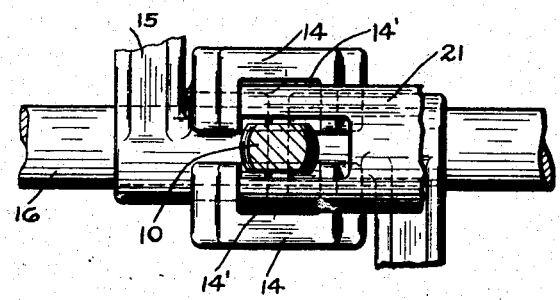
Figure 4 is a sectional view on line 4—4 of Figure 1.

In order to lock the lever 10 against movement by an unauthorized person so that the owner of a car may safely leave it without fear of its being stolen, the usual casting 12 is provided with an enlarged portion 17, which is provided with three bores or drill holes 18, 19, and 20 as shown in Figures 1 and 2.

Figure 3:
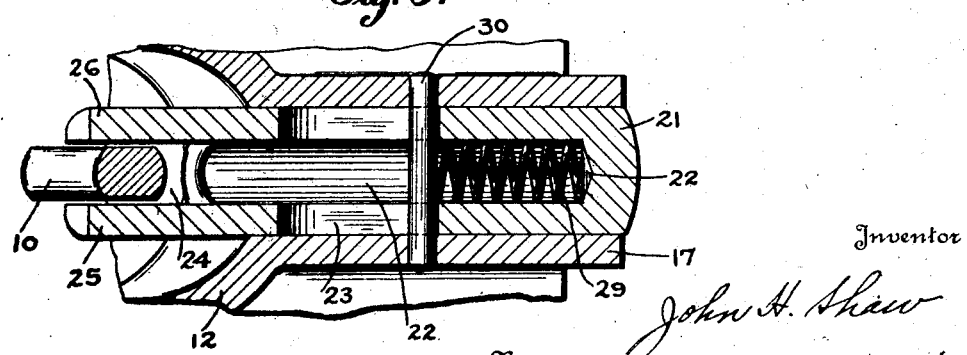
Figure 3 is a sectional view on line 3—3 of Figure 1.

In the drill hole 18, is slidably mounted a locking plunger 21, the construction of which is clearly shown in Figure 3. To form this plunger a cylindrical piece of brass or the like is taken and a bore 22 drilled therein from one end and extending nearly to the other end of the plunger. A slot 23, is then provided about midway of the length of the plunger, this slot communicating with the bore and extending through the plunger. Then at the end from which the bore 22 was drilled, a second slot 24 is cut transverse to the slot 23 and extending only a short distance from the end of the plunger. As shown in Fig. 3, this provides the plunger with bifurcated ends 25 and 26 which are adapted to straddle the shift lever 10. The ends of these portions 25 and 26 may be milled off in a plane inclined to the longitudinal axis of the plunger so that the plane of these ends will be substantially parallel to the lever 10 when mounted in the casting 17 as shown at 27 in Figures 1 and 2. The plunger is also provided with a recess 28, the purpose of which will be described hereafter.

A spring 29 of proper size and tension is then inserted into the bore 22 and a pin, 30, is inserted through the walls of the casting 17, passing through the slot 23 and confining the spring 29 to that portion of the bore 22 between this pin, 30, and the upper closed end of the bore. Thus the plunger is slidably but non-rotatably mounted in the drill hole 18 and the sliding movement limited by the length of the slot 23. When the plunger is in the position shown in Figure 1, it will be apparent that the spring is compressed between the pin 30 and the closed end of the bore 22 so that it will tend to throw the plunger outwardly to the position shown in Figure 2.

In the upper end of the drill hole 19 is a spring 31, which tends to force a lock bolt 32 downwardly into the recess 28, when this recess registers with the drill hole, 19. On the side of this lock bolt adjacent the third drill hole, 20, is a recess, 33, of channel shape, as shown, into which extends a lug or extension, 34, on the key barrel 35 of a lock, the case of which is mounted in the drill hole 19 as shown at 36 and which is of the usual pin tumbler type, the pin tumbler extension being shown at 37. A key 38 is shown in the lock in Figure 2, being shown in full lines in the position it occupies when the key barrel has been turned to withdraw the bolt 32 from the recess 28, by means of the lug 34. The recess 33 is sufficiently large to provide a lost motion connection between the lug 34 and bolt 32 so that the key and key barrel may be turned back one quarter of a revolution to normal position, to permit the withdrawal of the key from the lock, while the bolt 32 is held against movement by resting against a solid portion plunger 21. The key and lug 34 will then, respectively, occupy the positions shown in dotted lines in Figure 2. The key can then be withdrawn and the lug 34, is in the lower end of the recess 33 so that the spring 31 may force the bolt 32 into the recess 28 when the plunger 21 is pushed in to lock the lever 10 against movement.

The operation of the device is as follows:

The normal unlocked position of the parts is shown in Figure 2, except that the key is withdrawn from the key hole if desired, and the lug 34 occupies the dotted line position shown in this figure. This would be the position of the parts while the motor vehicle was in operation. If it is desired to leave the vehicle and lock the lever against movement, the operator brings the lever 10 to neutral position and with his hand or foot presses the plunger 21 into the casting When the recess 28 registers with the drill hole 19, the spring 31, forces the lock bolt into this recess and locks the plunger in the casting in the position shown in Figure 1, with the bifurcated ends 25 and 26 straddling the lever 10 and locking the lever against movement laterally to engage the lugs 14 to shift the gears. It is thus apparent that the lever can be locked without the use of the key. When it is desired to unlock the lever, the key 38 is inserted in the key hole in the dotted line position of Figure 2, and turned one quarter turn to the full line position, thus retracting the bolt 32 against the tension of the spring 31 and allowing the spring 29 to retract the plunger 21. The key can then be turned back to dotted line position and withdrawn from the lock.

Having thus described a preferred embodiment of my invention, it will be apparent that various minor changes may be made in the device herein disclosed without departing from the spirit of the invention as defined by the annexed claim.

What I claim is:

In a gear shift lever lock, a lever supporting bracket having a hollow portion, a gear shift lever pivoted at the upper portion of said bracket and having its lower end extending into said hollow portion to engage the shifting devices, said bracket having a solid enlarged portion at one side of the lever provided with an inclined face adjacent its upper part and having an inclined bore extending from said face into the hollow portion of the bracket, a plunger movably mounted in said bore, said bracket having a second bore in the inclined face thereof parallel to and above the first bore, and a third bore extending in a downward direction along the bottom of the second and terminating in the first named bore, a spring pressed bolt slidably mounted in said third bore and adapted to engage the plunger, a lock mounted in the second bore and having a lost motion connection with said bolt whereby the latter is free to move downwardly into engagement with the plunger, and said plunger having its inner end bifurcated to engage the lever adjacent the lower end when said plunger is moved inwardly and downwardly in its bore, the bifurcated end of said plunger having its face inclined to lie in a substantially vertical plane parallel with the lever when the latter is in neutral position, said spring pressed bolt moving to locking position in a downward direction whereby it is actuated by gravity as well as by its spring.

In witness whereof, I have hereunto set my hand on this 10th day of May, 1920.

JOHN H. SHAW.